United States Patent [19]

Miura et al.

[11] Patent Number: 4,844,991
[45] Date of Patent: Jul. 4, 1989

[54] MAGNETIC RECORDING MEDIUM AND PROCESS FOR THE PREPARATION OF THE SAME

[75] Inventors: Toshihiko Miura; Masaaki Fujiyama; Yutaka Kakuishi, all of Odawara, Japan

[73] Assignee: Fuji Photo Film Co., Ltd., Kanagawa, Japan

[21] Appl. No.: 38,176

[22] Filed: Apr. 14, 1987

[30] Foreign Application Priority Data

Apr. 14, 1986 [JP] Japan ................................ 61-86624

[51] Int. Cl.⁴ .............................................. G11B 5/70
[52] U.S. Cl. .................................. 428/694; 427/131; 427/355; 428/695; 428/900
[58] Field of Search .................. 428/695, 694, 900; 427/131, 355, 359

[56] References Cited

U.S. PATENT DOCUMENTS

| 4,087,582 | 5/1978 | Shirahata | 428/694 |
| 4,390,601 | 6/1983 | Ono | 428/900 |
| 4,476,195 | 10/1984 | Ono | 428/695 |
| 4,690,857 | 9/1987 | Shirahata | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a nonmagnetic support, a magnetic recording layer provided on the support which comprises a binder and a ferromagnetic powder dispersed therein, and a monomolecular film or a built-up film provided on the magnetic recording layer. The monomolecular or built-up film comprises a saturated fatty acid having 10–24 carbon atoms and/or its alkali metal salt which is oriented vertically to the plane of the film. A process for the preparation of the same is also disclosed.

7 Claims, 2 Drawing Sheets

MAGNETIC RECORDING MEDIUM AND PROCESS FOR THE PREPARATION OF THE SAME

BACKGROUND OF THE INVENTION

1. Field of the invention

The present invention relates to a magnetic recording medium comprising a nonmagnetic support and a magnetic recording layer, and a process for the preparation of the same. More particularly, the invention relates to a magnetic recording medium having a magnetic recording layer which shows a low friction coefficient and showing superior running property.

2. Description of prior art

A magnetic recording medium comprising a nonmagnetic support and a magnetic recording layer provided thereon is used as an audio tape, a video tape, or a recording medium for a computer system. The magnetic recording layer comprises a binder and a ferromagnetic powder dispersed therein.

A magnetic recording medium is desired to have a magnetic recording layer showing a low friction coefficient, because the magnetic recording layer records signals and reproduces the recorded signals while the surface of the magnetic recording layer is kept in contact with a magnetic head.

Recently, demand for a recording system of enhanced density has increased, and hence a more minimized ferromagnetic powder has been employed. The employment of such minimized ferromagnetic powder makes the surface of the magnetic recording layer very smooth, so that the friction coefficient on the surface of the magnetic recording layer tends to increase.

For reducing the friction coefficient on the surface of the magnetic recording layer, a lubricant such as fatty acid, a fatty acid ester, silicone oil or paraffinic hydrocarbon is generally incorporated into the magnetic recording layer. However, in the method of incorporating the lubricant into the magnetic recording layer, a large amount of such lubricant has to be employed because the lubricant is uniformly distributed in the whole magnetic recording layer including its bottom portion.

In such magnetic recording layer, the lubricant existing on the surface of the magnetic recording layer simply deposits on the recording layer, and hence the lubricant is liable to adhere to a supporting rod or a magnetic head equipped in a recording and reproducing device and drop off from the recording layer when the recording layer is repeatedly run in contact with the supporting rod or the magnetic head. Accordingly, the lubricant on the recording layer is easily removed in the running procedure.

Further, since a large amount of lubricant is used, the lubricant sometimes serves as a plasticizer for the binder to lower the mechanical strength of the magnetic recording layer.

The above-mentioned conventional magnetic recording medium is not improved sufficiently in the running property, although the electromagnetic conversion characteristics required for high density recording are improved.

SUMMARY OF THE INVENTION

It is an object of the present invention to provide a magnetic recording medium which has a low friction coefficient on the surface of the magnetic recording layer and shows improved running property, and a process for the preparation of the same.

There is provided by the present invention a magnetic recording medium comprising a nonmagnetic support, a magnetic recording layer provided on the support which comprises a binder and a ferromagnetic powder dispersed therein, and a monomoleclar film or a built-up film provided on the magnetic recording layer, said monomolecular film or built-up film comprising a saturated fatty acid having 10–24 carbon atoms and/or an alkali metal salt thereof which is oriented vertically to the surface plane of the film.

The magnetic recording medium can be advantageously prepared by a process according to the invention which comprises the steps of laminating a magnetic recording layer comprising a ferromagnetic powder dispersed in a binder on a nonmagnetic support, then applying a coating solution containing a saturated fatty acid having 10–24 carbon atoms and/or an alkali metal salt thereof onto the surface of the magnetic recording layer to form a coating layer of the solution, and rubbing the surface of the coated layer with a metal.

The magnetic recording medium of the present invention has a surface of low friction coefficient on the magnetic recording layer, and hence shows superior running property.

Further, the monomolecular film or the built-up film provided on the surface of the magnetic recording layer is hardly removed off from the recording layer even when the film is repeatedly run in contact with a supporting rod, a magnetic head, etc. equipped in the recording and reproducing device, whereby superior running property of the magnetic recording medium can be kept stably for a long period of time.

In the invention, since incorporation of a lubricant into the magnetic recording layer is not necessary, or since at least the amount of a lubricant can be reduced, the amount of the ferromagnetic powder incorporatable into in the recording layer is increased. Thereofore, the electromagnetic conversion characteristics can be prominently enhanced.

Furthermore, when a lubricant is not contained in the magnetic recording layer, an action of a lubricant as a plasticizer for the binder is not brought about, and there is avoided occurrence of physical deterioration of the binder which is liable to take place depending on an unsuitable combination of a binder and a lubricant.

DETAILED DESCRIPTION OF THE INVENTION

Figure 1:
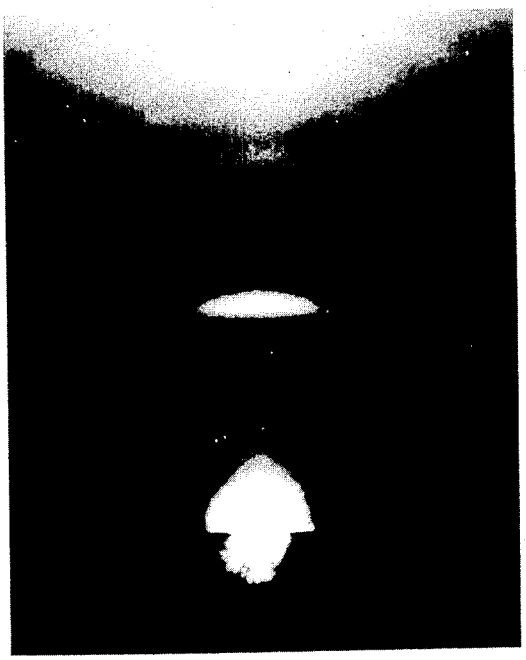
FIG. 1 is a high-speed reflecting electron rays diffraction photograph showing an example of orientation of a saturated fatty acid in a built-up film which is formed on the surface of a magnetic recording layer of a magnetic recording medium according to the present invention.

The magnetic recording medium of the present invention basically comprises a nonmagnetic support and a magnetic recording layer provided on the support which comprises a ferromagnetic powder dispersed in a binder, which is basically not different from the structure of the conventional magnetic recording medium.

In the present invention, the surface of the magnetic recording layer is provided with a monomolecular film or a built-up film which is cmposed of a saturated fatty acid having 10-24 carbon atoms and/or an alkali metal salt thereof oriented vertically to the surface plane of the film.

The nonmagnetic support employable in the invention can be selected from those conventionally employed such as plastic films (e.g., polyester terephthalate film).

The thickness of the nonmagnetic support is generally in the range of 3 to 50 $\mu$m, preferably in the range of 5 to 30 $\mu$m.

In the process for the prepartion of a magnetic recording medium according to the invention, the nonmagnetic support may have a back layer (i.e., backing layer) on the opposite side of the side where a layer of the magnetic paint is to be coated. Further, the nonmagnetic support may be provided with an adhesive layer on the side where a magnetic recording layer is to be coated.

The magnetic recording layer is a layer containing a ferromagnetic powder and a binder as its basic components.

The ferromagnetic powder can be also selected from those conventionally employed.

Examples of the ferromagnetic powder employable in the invention include a metal oxide-type ferromagnetic powder such as $\gamma$-$Fe_2O_3$, a modified metal oxide-type ferromagnetic powder such as $\gamma$-$Fe_2O_3$ containing other component such as cobalt, and a ferromagnetic metal powder containing a ferromagnetic metal such as iron, cobalt and/or nickel.

Particularly preferred is a ferromagnetic metal powder, because the ferromagnetic metal powder can be prominently minimized, and the magnetic recording medium using the ferromagnetic metal powder is apt to increase in the friction coefficient on the surface of the magnetic recording layer.

The ferromagnetic metal powder employable in the invention is one containing iron, cobalt and/or nickel, and having a specific surface area (S-BET) of not less than 42 $m^2/g$, preferably not less than 45 $m^2/g$.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, Ze-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide.

Processes for the preparation of the above-mentioned ferromagnetic powders are already known, and the ferromagnetic powder employed in the invention can be prepared by the known processes.

There is no specific limitation with respect to the shape of the ferromagnetic powder employable in the present invention, but generally used is a ferromagnetic powder in a needle shape, a grain shape, a dice shape, a rice shape or a plate shape. Preferably employed is a ferromagnetic powder in a needle shape.

The resin component composing a binder employable in the preparation of a magnetic recording layer can be selected from those conventionally employed. Examples of the resin component include vinyl chloride copolymers (e.g., vinyl chloride/vinyl acetate copolymer, vinyl chloride/vinyl acetate/vinyl alcohol copolymer, vinyl chloride/vinyl acetate/maleic anhydride copolymer, vinyl chloride/vinyl acetate/acrylic acid copolymer, vinylidene chloride/vinyl chloride copolymer, vinyl chloride/acrylonitrile copolymer, ethylene/vinyl acetate copolymer, and vinyl chloride copolymer incorporated with a polar group such as —$SO_3Na$ or —$SO_2Na$ and an epoxy group), cellulose derivatives such as nitrocellulose, acrylic resin, polyvinyl acetal resin, polyvinyl butyral resin, epoxy resin, phenoxy resin, and polyurethane resin (e.g., polyester polyurethane resin, polyurethane resin incorporated with a polar group such as —$SO_3Na$ or —$SO_2Na$, and polycarbonate polyurethane resin).

The binder employable in the invention is preferably a cured material coprising the above-mentioned resin component and a curing agent.

As the curing agent, a polyisocyanate compound is generally employed.

As the resin component of the binder, a combination of a resin of high hardness such as a vinyl chloride copolymer and a resin having flexibility such as a polyurethane resin is preferably employed in the invention.

In the case of using the combination of a vinyl chloride copolymer and a polyurethane resin as the resin component, the ratio between the former and the latter is generally in the range of from 9:1 to 4:6, preferably in the range of from 9:1 to 5:5, by weight.

In the case that the binder is a cured material comprising the above-mentioned resin component and the curing agent, the ratio between the resin component and the curing agent is generally in the range of from 9:1 to 5:5 (resin component:curing agent), preferably in the range of from 9:1 to 6:4 (same), by weight.

The total amount of the resin component and the curing agent is generally in the range of 10-100 parts by weight, preferably 15-40 parts by weight, based on 100 parts by weight of the ferromagnetic powder employed.

In the magnetic recording medium of the present invention, the magnetic recording layer is provided with a monomolecular film or a built-up film comprising a saturated fatty acid having 10-24 carbon atoms and/or an alkali metal salt thereof which is oriented vertically to the surface of the film. The monomolecular film or the built-up film preferably comprises a straight-chain saturated fatty acid having 12-22 carbon atoms and/or an alkali metal salt thereof.

Examples of the preferred saturated fatty acids include lauric acid, myristic acid, palmitic acid, stearic acid, arachic acid and behenic acid.

In the case of using an alkali metal salt of the saturated fatty acid having 10-24 carbon atoms, preferred are sodium salts of the above-mentioned saturated fatty acid such as lauric acid, myristic acid, palmitic acid, stearic acid, arachic acid and behenic acid.

The above-mentioned saturated fatty acid can be used in combination with the alkali metal salt of the saturated fatty acid, and in this case they are appropriately mixed and the mixture is used to form a monomolecular film or a built-up film.

Each of the saturated fatty acid or the alkali metal salt thereof can be employed singly or in combination.

In the invention, an unsaturated fatty acid such as an oleic acid is unsuitable, because such unsaturated fatty acid is apt to be adsorbed by the magnetic recording layer at its carboxyl group and double bonding site and cannot be oriented vertically or substantially vertically to the surface of the magnetic recording layer, and thereby a monomolecular film or built-up film cannot be formed on the recording layer.

However, a fatty acid ester or an unsaturated fatty acid may be incorporated into the monomolecular film or built-up film in such an amount that no adverse effect is given in the formation of the monomolecular film or built-up film, as far as the above-mentioned saturated fatty acid or alkali metal salt thereof is a host component of the resulting monomolecular film or built-up film.

FIG. 1 is an example of high-speed reflecting electron rays diffraction photograph showing orientation of a saturated fatty acid in a built-up film which is formed on the magnetic recording layer of the magnetic recording medium according to the present invention.

Figure 2:
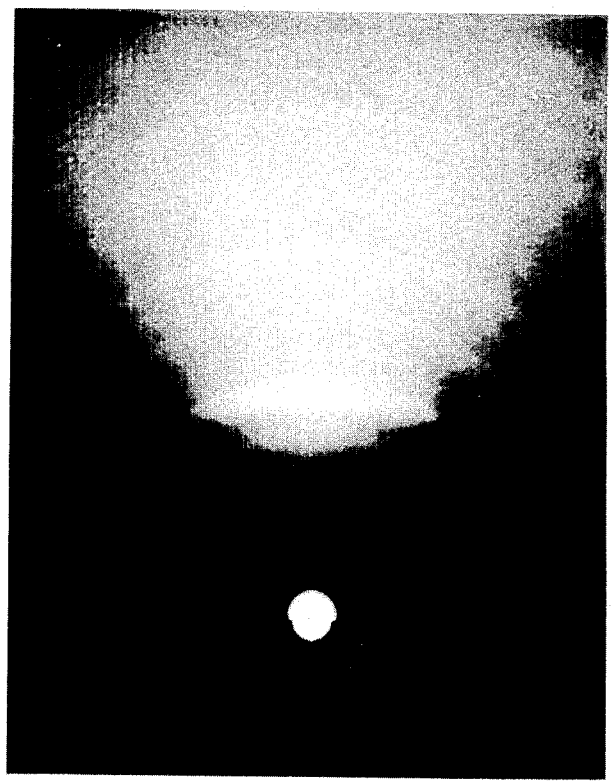
FIG. 2 is a high-speed reflecting electron rays diffraction photograph for the surface ofa magnetic recording layer of the conventional magnetic recording medium which is not provided with a monomolecular or built-up film thereon.

FIG. 2 is an example of high-speed reflecting electron rays diffraction photograph for the surface of a magnetic recording layer of a conventional magnetic recording medium which is not provided with a monomolecular film or a built-up film.

When a magnetic recording medium containing a saturated fatty acid as a lubricant in the magnetic recording layer is diffracted on the suface of the recording layer by a high-speed reflecting electron rays diffraction method, plural diffraction patterns in the form of arcs are generally observed around a spot directly irradiated with the electron rays (directly irradiated spot). These are diffraction patterns of the ferromagnetic powder contained in the magnetic recording layer. The central bright portion shown in FIG. 2 is the directly irradiated spot, and a plurality of diffraction bands of the ferromagnetic powder are observed around the directly irradiated spot.

In contrast, in the diffraction patterns of the magnetic recording medium of the present invention, there are observed a first diffraction band in parallel with the surface of the sample (i.e., magnetic recording layer) at the location indicated by an arrow 1 above the directly irradiated spot and further a second diffraction band in parallel with the surface of the sample at the location indicated by an arrow 2.

Such diffraction bands in parallel with the surface of the sample have the same tendency of that of the reflecting electron rays-diffraction bands of a Langmurie-Blodgett film in which a stearic acid is ideally vertically oriented which was observed by L. H. Germer and K. H. Storks. See, J. Chem. Phys. 6,289 (1938).

In more detail, since the diffraction bands appear in parallel with the surface of the sample (magnetic recording layer) in the high-speed electron rays diffraction photograph of the surface of the magnetic recording layer according to the invention, it is confirmed that a monomolecular film or a built-up film wherein the saturated fatty acid is oriented vertically to the film surface is formed on the magnetic recording layer.

Since a monomolecular film is generally adsorbed by a substrate through a hydrophilic group thereof, the monomolecular film of the invention is presumably adsorbed by the surface of the magnetic recording layer through the hydrophilic carboxyl group of the saturated fatty acid. In the case of a built-up film, it is presumed that on the first monomolecular film provided on the magnetic recording layer is formed the second monomolecular film in such a manner that an alkyl group of the first monomolecular film adsorbed by the recording layer through the carboxyl group faces an alkyl group of the second monomolecular film, and as a result plural monomolecular films are laminated in such a manner that carboxyl groups face each other and alkyl groups face each other, so as to form a built-up film.

The monomolecular film has an integral structure in which a saturated fatty acid (or an alkali metal salt thereof) adsorbed by the magnetic recording layer owing to the adsorption of the carboxyl group is bonded with other saturated fatty acid (or other alkali metal salt thereof) existing therearound for example through hydrogen bonding. The built-up film has a structure in which the above-described monomolecular film is laminated with other similar monomolecular films of high mechanical strength. Accordingly, such monomolecular film or built-up film has prominently higher strength and shows higher lubricity, as compared with a layer prepared simply by coating a solution of saturated fatty acid in which the saturated fatty acid exists in disorder.

Hence, the magnetic recording medium of the present invention has a low friction coefficient on the surface of the magnetic recording layer and shows high running property. Further, the monomolecular or built-up film is hardly removed from the medium even when the medium is run in conact with a supporting rod, a magnetic head, etc. in the recording and reproducing device, and therefore the magnetic recording medium of the invention can keep high running property for a long period of time.

The magnetic recording medium of the present invention can be prepared, for instance, by a process described below.

The magnetic recording layer can be formed on the nonmagnetic support according to a conventional manner.

For instance, a resin component, a ferromagnetic powder and a curing agent are kneaded and dispersed in a solvent to pepare a magnetic paint, and the magnetic paint is coated over the nonmagnetic support in such a manner that the resulting magnetic recording layer would have thickness of 0.5 to 10 $\mu$m. The coated layer of the magnetic paint is generally subjected to various processes such as a drying process, a magnetic orientation and a surface smoothing process.

The magnetic paint may contain other known additives such as an abrasive, an antistatic agent, and a dispersing agent, or a filler in addition to the above-mentioned components.

In the invention, it is unnecessary to use a lubricant generally contained in a conventional magnetic recording layer, but the lubricant may be incorporated into the magnetic recording layer if desired.

On the surface of the magnetic recording layer prepared as above is coated a solution dispersing or dissolving the aforementioned saturated fatty acid in an organic solvent.

As the organic solvent, there can be mentioned those conventionally employed such as methyl ethyl ketone, toluene, xylene, ethyl acetate, n-hexane and ethanol.

The solution of the saturated fatty acid is coated over the surface of the magnetic recording layer in such an amount that the amount of the saturated fatty acid on the surface of the magnetic recording layer would be generally in the range of 1 to 50 mg/m$^2$, preferably 1 to 10 mg/m$^2$, more preferably 2 to 8 mg/m$^2$, after removal of the solvent.

When the amount of the saturated fatty acid is less than 1 mg/m$^2$, a continuous monomolecular film cannot be sometimes prepared effectively. Even when the amount of the saturated fatty acid exceeds 50 mg/m$^2$, the friction coefficient on the surface of the magnetic recording layer cannot be reduced to a level lower than a certain maximum level, and a dust is liable to deposit on the surface of the recording layer.

In the case of using a low-boiling solvent such as methyl ethyl ketone as an organic solvent, the solvent is removed from the coated layer of the solution through evaporation by simply allowing the coated layer to stand. In the case of using a high-boiling solvent, the solvent can be removed through evaporation for instance by heat treatment.

The surface of the coated layer of the saturated fatty acid prepared on the surface of the magnetic recording layer as described above is then rubbed with a metal to vertically or substantially vertically orient the saturated fatty acid to the surface of the magnetic recording layer, whereby a monomolecular film or a built-up film can be formed.

As the metal for rubbing the surface of the coated layer of the saturated fatty acid, there are generally employed a stainless steel having a smooth surface, and the like. When a sapphire blade or a nonwoven fabric is used for rubbing the surface of the coated layer, a certain level of orientation can be obtained, but the level is unsatisfactory.

The laminated sheet comprising the above-mentioned nonmagnetic support and magnetic recording layer is generally in the continuous long form, the rubbing process of the surface of the coated layer of the saturated fatty acid with the above-mentioned metal is preferably done by running the laminated sheet and providing a tension to the sheet in such a manner that the surface of the coated layer is brought into contact with the metal.

The above-mentioned laminated sheet is generally run in a successive preparation device of magnetic recording media at a rate of 1–200 m/min. by providing a tension of 10–30 g. per width of 1 cm. In the invention, it is also possible to use the conventional successive preparation device of magnetic recording media installed with the aformentioned metal and run the laminated sheet in such a manner that the surface of the coated layer of the saturated fatty acid is brought into contact with the metal so as to rub the surface of the coated layer with the metal.

Thus, the saturated fatty acid is oriented vertically to the surface of the magnetic recording layer so as to form a monomolecular film or a built-up film on the laminated sheet. The laminated sheet having the monomolecular film or the built-up film of the saturated fatty acid thereon is cut to give a desired shape. The cutting process can be also done prior to coating the solution containing the saturated fatty acid in an organic solvent over the laminated sheet.

The example an the comparison examples of the present invention are given below. In the following examples, the expression "part(s)" means "part(s) by weight", unless otherwise specified.

EXAMPLE 1

The components for a magnetic paint indicated below were kneaded in a ball mill to give a magnetic paint.

| | |
|---|---|
| Ferromagnetic metal alloy powder (Fe—Ni alloy, Fe: 95 wt. %, Ni: 5 wt. %, specific surface area: 45 m$^2$/g, | 100 parts |
| Vinyl chloride/vinyl acetate/maleic anhydride copolymer (400 × 100A, available from Nippon Geon Co., Ltd., Japan) | 12 parts |
| Polyurethane resin (Niporan N-2301, available from Nippon Polyurethane Co., Ltd., Japan) | 12 parts |
| Polyisocyanate compound (Colonate L, available from Nippon Polyurethane Co., Ltd.) | 12 parts |
| Carbon black (average particle size: 40 mμ) | 2 parts |
| Methyl ethyl ketone | 300 parts |

The obtained magnetic paint was coated over a polyethylene terephthalate support (thickness: 10 μm) by means of a reverse roll in such a manner that the resulting magnetic recording layer would have thickness of 3.0 μm.

The nonmagnetic support having the coated layer of the magnetic paint thereon was treated with an electromagnet at 3,000 gauss under wet condition to give magnetic orientation. After the coated layer was dried, the dried layer was subjected to supercalendering, and then slit into a laminated sheet of ½ inch thick comprising a nonmagnetic support and a magnetic recording layer.

Subsequently, on the surface of the magnetic recording layer of the laminated sheet was coated a stearic acid dissolved in methyl ethyl ketone by means of a coil bar in such a manner that the amount of the stearic acid in the coated layer would be 6.9 mg/m$^2$. To the laminated sheet having the coated layer of stearic acid was applied a tension of 50 g. and the sheet was run at a rate of 5 m/min. During the running procedure, the surface of the coated layer was continuously brought into contact with a stainless pole to rub the surface of the coated layer with the stainless pole, whereby the stearic acid was oriented on the laminated sheet. Thus, a VHS-type video tape was prepared.

The obtained video tape was examined on the orientation conditions of the saturated fatty acid on the surface of the magnetic recording layer by a high-speed reflecting electron rays diffraction method.

The high-speed electron rays diffraction method was performed by inserting the obtained video tpae into a sample holder for obtaining a reflection electron rays diffraction and using a transmissive electron microscope (produced by Hitachi Co., Ltd). In this method, the accelerating voltage was set to 75 kV.

The detailed conditions in the measurement were set according to the conditions described in "TECHNIQUE OF PHYSICAL MEASUREMENT", Vol. 2, Analysis of Crystal; written by Shuichi Iida, et al., published by Asakura Soten, 1969.

FIG. 1 shows a high-speed reflecting electron rays diffraction photograph of the surface of the magnetic recording layer of the obtained video tape.

As shown in FIG. 1, the first diffraction band and the second diffraction band, both in parallel with the magnetic recording layer, were clearly observed in the obtained video tape, and it was confirmed that a built-up film was formed on the surface of the magnetic recording layer.

In the following comparison examples, the high-speed reflecting electron rays diffraction was conducted according to the above-described process.

Further the obtained video tape was measured on the friction coefficient on the surface of the magnetic recording layer in a conventional manner. The friction coefficient on the surface of the magnetic recording layer was 0.21.

COMPARISON EXAMPLE 2

The procedure of Example 1 was repeated except that the coated layer of the methyl ethyl ketone solution of the stearic acid was not rubbed with the surface of the stainless pole, to prepare a VHS-type video tape.

The obtained video tape was examined on the orientation of the saturated fatty acid on the surface of the magnetic recording layer according to the above-mentioned high-speed reflecting electron rays diffraction method.

FIG. 2 shows a high-speed reflecting electron rays diffraction photograph of the surface of the magnetic recording layer of the obtained video tape.

As shown in FIG. 2, the diffraction bands were in the form of arcs and found around the directly irradiated spot, and any band in parallel with the magnetic recording layer as found in FIG. 1 is not observed.

The diffraction bands in the form of arcs were those of the ferromagnetic metal powder contained in the magnetic recording layer as described hereinbefore, and it was confirmed that neither monomolecular film nor built-up film of the stearic acid is formed on the surface of the obtained video tape.

The obtained video tape was measured on friction coefficient on the surface of the magnetic recording layer in the same manner as described in Example 1. The friction coefficient on the surface of the magnetic recording layer was 0.28.

COMPARISON EXAMPLE 2

The procedure of Example 1 was repeated except for using an oleic acid instead of the stearic acid, to prepare a VHS-type video tape.

The obtained video tape was examined on the orientation of the oleic acid on the surface of the magnetic recording layer according to the above-mentioned high-speed reflecting electron rays diffraction method. In the examination, diffraction bands in the form of arcs located around the directly irradiated spot which were similar to those of Comparison Example 1 were observed, but any diffraction band in parallel with the magnetic recording layer was not observed.

Therefore, it was confirmed that the oleic acid formed neither monomolecular film nor built-up film on the magnetic recording layer.

We claim:

1. A magnetic recording medium comprising a non-magnetic support, a magnetic recording layer provided on the support which comprises a binder and a ferromagnetic powder dispersed therein, and a monomolecular film or a built-up film which has been rubbed with a metal provided on the magnetic recording layer in an amount of 1 to 50 mg/m$^2$, said monomolecular or built-up film comprising a saturated fatty acid having 10–24 carbon atoms and/or an alkali metal salt thereof which is oriented vertically to the plane of the film.

2. The magnetic recording medium as claimed in claim 1, wherein said saturated fatty acid and/or alkali metal salt thereof is a straight-chain saturated fatty acid having 12–22 carbon atoms and/or an alkali metal salt thereof.

3. The magnetic recording medium as claimed in claim 1, wherein said monomolecular film or built-up film comprises the saturated fatty acid and/or alkali metal salt thereof in an amount of 1 to 10 mg/m$^2$.

4. A process for the preparation of a magnetic recording medium which comprises the steps of laminating a magnetic recording layer comprising a binder and a ferromagnetic powder dispersed therein on a non-magnetic support, then applying a coating solution containing a saturated fatty acid having 10–24 carbon atoms and/or an alkali metal salt thereof onto the surface of the magnetic recording layer to form a coated layer with a metal to form a monomolecular film layer of the saturated fatty acid and/or the alkali metal salt thereof in an amount of 1 to 50 mg/m$^2$ which is oriented vertically to the plane of the film.

5. The process as claimed in claim 4, wherein said saturated fatty acid and/or alkali metal salt thereof is a straight-chain saturated fatty acid having 12–22 carbon atoms and/or an alkali metal salt thereof.

6. The process as claimed in claim 4, wherein said metal is a stainless steel.

7. The process as claimed in claim 4, wherein the amount of the saturated fatty acid contained in the coated layer ranges from 1 to 10 mg/m$^2$.

* * * * *